UNITED STATES PATENT OFFICE.

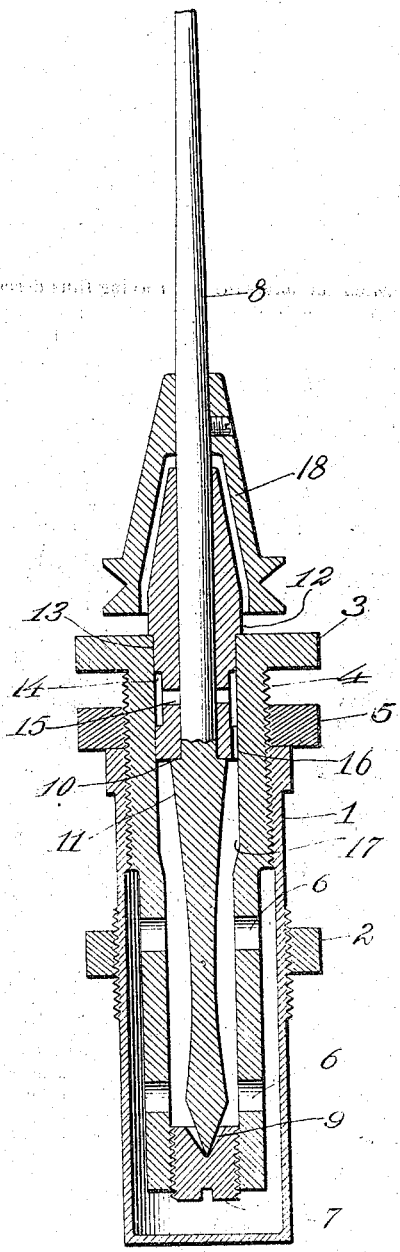

EDWARD TACHE, OF NEW MARKET, NEW HAMPSHIRE.

SPINDLE.

No. 866,979.

Specification of Letters Patent.

Patented Sept. 24, 1907.

Application filed August 21, 1906. Serial No. 331,484.

*To all whom it may concern:*

Be it known that I, EDWARD TACHE, a subject of the King of Great Britain and Ireland, residing at New Market, in the county of Rockingham, State of New Hampshire, have invented certain new and useful Improvements in Spindles, of which the following is a description, reference being had to the accompanying drawings, forming a part hereof.

The object of the present invention is to produce an improved self-lubricating spindle for spinning machines, and it consists in the improved spindle described in the following specification and claimed in the appended claims.

The figure represents a vertical central section of my improved spindle.

1 is a bolster-case threaded as shown and provided with a nut 2, whereby it may be secured to a spindle rail not shown. This bolster case will contain a considerable quantity of oil when the spindle is in operation.

3 is a bolster threaded as shown at 4 and provided with a lock nut 5, whereby the bolster is adjustably secured in the bolster case. Said bolster is provided with perforations 6—6 through which oil contained in the bolster case has access to the spindle bearings.

7 is a step or bearing carried by the bolster 3 as shown, said bearing being screw-threaded and engaging corresponding threads in the bolster.

8 is the spindle. This spindle is provided with a conical end as at 9 adapted to rest within a corresponding depression in the step 7 and thereby form a conical bearing for the lower end of the spindle.

10 is a shoulder formed upon the spindle; and said spindle is flared or tapered at 11 as shown.

12 is an upper bearing for the spindle, and comprises a depending portion 13 against which the shoulder 10 bears and is provided with an oil groove 14 and openings 15 through which oil reaches the bearing. 16 is a passage leading from said oil groove to the oil space within the bolster. The bolster is recessed as at 17; and it will be seen that as the spindle rotates centrifugal force will cause the oil contained in the bolster case and which has access to the spindle through the openings 6 6, to pass along the flared portion 11 of the spindle and through the passage 16 to the upper spindle bearing, the recess 17 facilitating such flow of oil.

18 is a sleeve whirl by which the spindle is operated.

It will thus be seen that the lower spindle bearing is submerged in oil contained in the bolster case, and that a continuous flow of oil is supplied to the upper bearing, thereby keeping it in a flooded condition.

Having thus described my invention and explained the mode of operation thereof, I claim and desire to secure by Letters Patent:

1. In a spindle, a bolster case adapted to contain oil and having an interiorly threaded portion adjacent its upper end; means whereby said case may be secured to a spindle rail; a bolster threaded exteriorly at its upper end to engage the threaded portion of said bolster case; a lock nut for securing said parts after they have been properly adjusted; upper and lower bearings carried by said bolster; a spindle supported in said bearings; a shoulder upon said spindle in contact with said upper bearing, whereby upward movement of the spindle is prevented; said spindle having an upwardly flared portion terminating at the said shoulder; and openings in said bolster through which oil contained in the bolster case has access to the spindle.

2. In a spindle, a bolster case adapted to contain oil; means whereby said case may be secured to a spindle rail; a bolster adjustably supported within said case; a lower bearing carried by said bolster; a removable upper bearing carried by said bolster; an oil passage leading from the interior of said bolster for supplying oil to said upper bearing; a spindle supported in said bearings; a shoulder upon said spindle and in contact with said upper bearing for preventing upward movement of said spindle; said spindle having an upwardly flared portion terminating at the said shoulder; means for adjusting said bolster in said case and for securing it in its adjusted position; and openings in said bolster through which oil contained in the bolster case has access to the spindle.

3. In a spindle, a bolster case adapted to contain oil; means whereby said case may be secured to a spindle rail; a bolster adjustably supported within said case; a lower bearing carried by said bolster; a removable upper bearing carried by said bolster; a recess within said bolster adjacent said upper bearing; an oil passage leading from said recess to said upper bearing; a spindle supported in said bearings; a shoulder upon said spindle and in contact with said upper bearing for preventing upward movement of said spindle; said spindle having an upwardly flared portion terminating at the said shoulder; and openings in said bolster through which oil contained in the bolster case has access to the spindle.

This specification signed and witnessed this sixteenth day of August A. D. 1906.

EDWARD TACHE.

In the presence of—
F. E. TUTTLE,
H. C. KING.